(12) United States Patent
Baumeier (10) Patent No.: US 7,735,899 B2
(45) Date of Patent: Jun. 15, 2010

(54) CONVERTIBLE AUTOMOBILE

(75) Inventor: Andreas Baumeier, Bissendorf (DE)

(73) Assignee: Wilhelm Karmann GmbH, Osnabruck (DE)

( * ) Notice: Subject to any disclaimer, the term of this patent is extended or adjusted under 35 U.S.C. 154(b) by 11 days.

(21) Appl. No.: 10/547,373

(22) PCT Filed: Feb. 17, 2004

(86) PCT No.: PCT/DE2004/000284

§ 371 (c)(1),
(2), (4) Date: Nov. 6, 2006

(87) PCT Pub. No.: WO2004/078505

PCT Pub. Date: Sep. 16, 2004

(65) Prior Publication Data

US 2007/0063534 A1    Mar. 22, 2007

(30) Foreign Application Priority Data

Mar. 3, 2003 (DE) .................................. 103 09 366

(51) Int. Cl.
*B60J 7/20* (2006.01)
(52) U.S. Cl. ..................... 296/107.08; 296/136.04; 296/136.05
(58) Field of Classification Search ............ 296/107.08, 296/108, 136.06, 136.05, 136.04
See application file for complete search history.

(56) References Cited

U.S. PATENT DOCUMENTS

| 1,799,050 | A |   | 3/1931 | Kuturlash |
|---|---|---|---|---|
| 4,218,937 | A | * | 8/1980 | Albrecht et al. ............... 74/513 |
| 4,630,858 | A |   | 12/1986 | Bez |
| 4,674,788 | A |   | 6/1987 | Ohmura et al. |

(Continued)

FOREIGN PATENT DOCUMENTS

DE    4207658    9/1993

(Continued)

OTHER PUBLICATIONS

"Hatchback" Wikipedia, the free encyclopedia, pp. 1-6, http://en.wkipedia.org/wiki/Hatchback.

*Primary Examiner*—Glenn Dayoan
*Assistant Examiner*—Melissa A Black
(74) *Attorney, Agent, or Firm*—Gifford, Krass, Sprinkle, Anderson & Citkowski, P.C.

(57) ABSTRACT

The invention relates to a convertible vehicle (1) comprising a roof (2) which can be stored below a cover part (6) arranged below in the back of a vehicle. The cover part can be selectively opened in order to release a charging hole for luggage or to release an opening for the roof (2). A first pivoting axis (7), for said above-mentioned opening (7), is arranged in the region of a rear sided closing edge of the cover part (6) and at least the lateral swinging arms (10) associated with at least the longitudinal sides of the vehicle are coupled to the cover part (6) by means of a joint connection. The convertible vehicle is configured in such a manner that tolerance compensation is provided in the cover part (6) and/or in the joint connection (12). Said compensation results in a deviation of the trajectory of one part of the cover part (6) and/or the joint connection (12) of the circular trajectory (20, 21), at least during the pivoting of the cover part (6) in order to release the opening for the roof.

10 Claims, 8 Drawing Sheets

U.S. PATENT DOCUMENTS

| | | | |
|---|---|---|---|
| 5,120,105 | A | 6/1992 | Brin et al. |
| 5,141,281 | A | 8/1992 | Eger et al. |
| 5,876,088 | A | 3/1999 | Spears |
| 6,086,958 | A * | 7/2000 | Russell et al. ............ 427/385.5 |
| 6,250,707 | B1 | 6/2001 | Dintner et al. |
| 6,325,445 | B1 * | 12/2001 | Schenk .................. 296/107.08 |
| 6,378,932 | B1 | 4/2002 | Fasel et al. |
| 6,578,899 | B2 | 6/2003 | Hasselgruber et al. |
| 6,585,307 | B1 | 7/2003 | Queveau et al. |
| 6,824,194 | B2 * | 11/2004 | Weissmueller et al. . 296/136.05 |
| 7,178,852 | B2 | 2/2007 | Obendiek et al. |
| 2003/0218355 | A1 | 11/2003 | Stenvers et al. |
| 2004/0256885 | A1 | 12/2004 | Bui |
| 2005/0029833 | A1 | 2/2005 | Obendiek |

FOREIGN PATENT DOCUMENTS

| | | |
|---|---|---|
| DE | 19756062 | 4/1999 |
| DE | 19932500 | 2/2001 |
| DE | 10038530 | 2/2002 |
| DE | 10052001 | 5/2002 |
| DE | 10051996 | 8/2002 |
| DE | 10159390 C1 | 11/2002 |
| EP | 1074415 A2 | 2/2001 |
| EP | 1281533 | 2/2003 |
| EP | 1285802 | 2/2003 |

* cited by examiner

CONVERTIBLE AUTOMOBILE

FIELD OF THE INVENTION

This invention relates to a convertible automobile with a roof that can be stored under a cover panel, as conceptually specified in claim 1.

BACKGROUND OF THE INVENTION

DE 197 56 062 describes a similar convertible automobile in which, apart from the first rearward swivel axis (identified by reference number 13), two separate lateral auxiliary frames are provided without any cross connection extending through the vehicle. These frames can be rotated relative to the vehicle body (around an axis 6). Their respective ends facing away from the swivel axis support a crank-like articulated lever (reference number 4 in that document) whose end facing away from the respective auxiliary frame supports a multiarticulated linkage. This design requires numerous links and components at a correspondingly high manufacturing cost. Moreover, because of the many pivots involved the movement of the cover panel is imprecise.

To address that problem it is the objective of this invention to improve the design of a convertible automobile of the type mentioned in terms of the configuration and kinematics of the cover-panel support system.

The invention solves the problem with a convertible automobile exhibiting the features specified in claim 1. Advantageous design enhancements of the object of the invention are described in the subsequent claims 2 to 12.

The design according to the invention allows for a reduced number of components. For example, no additional articulated link is needed between a body-mounted lever and the links connecting to the cover panel. The elastic give permits a movement of the cover panel that would not be feasible with mechanical links without requiring additional components.

Given this elasticity, considerable tolerances are acceptable in the manufacturing process, simplifying the installation of modules for the cover panel and its drive mechanisms while reducing the cost of manufacture.

With a compensating tolerance in the cover panel assembly it is possible to use for the joints plain pivots without any design modifications, obviating the need for any translational movement between individual links or between these and the cover panel. Slots, rocker arms and the like are not needed The elastic deformability of the cover panel in the transition between an essentially horizontal and an essentially vertical section permits such deformation in visually inconspicuous fashion by an even larger degree, for instance at a transitional angle of 3° to 4°, in turn allowing for substantial differences between the paths traveled by spatially separated, mutually opposite sections of the cover panel.

If in its completely open and its completely closed state the cover panel is held in place without any deformation, no elastic give is needed in these positions, thus avoiding especially a permanent tensional stress on the cover panel.

Specifically, all links that connect to the cover panel can be directly coupled to a swivel lever that is pivot-mounted on the vehicle body, without requiring any additional intermediate components.

Other advantages and features of the invention will be evident from the implementation examples of the object of this invention illustrated in the drawings and described below.

DETAILED DESCRIPTION OF THE INVENTION

Figure 1:
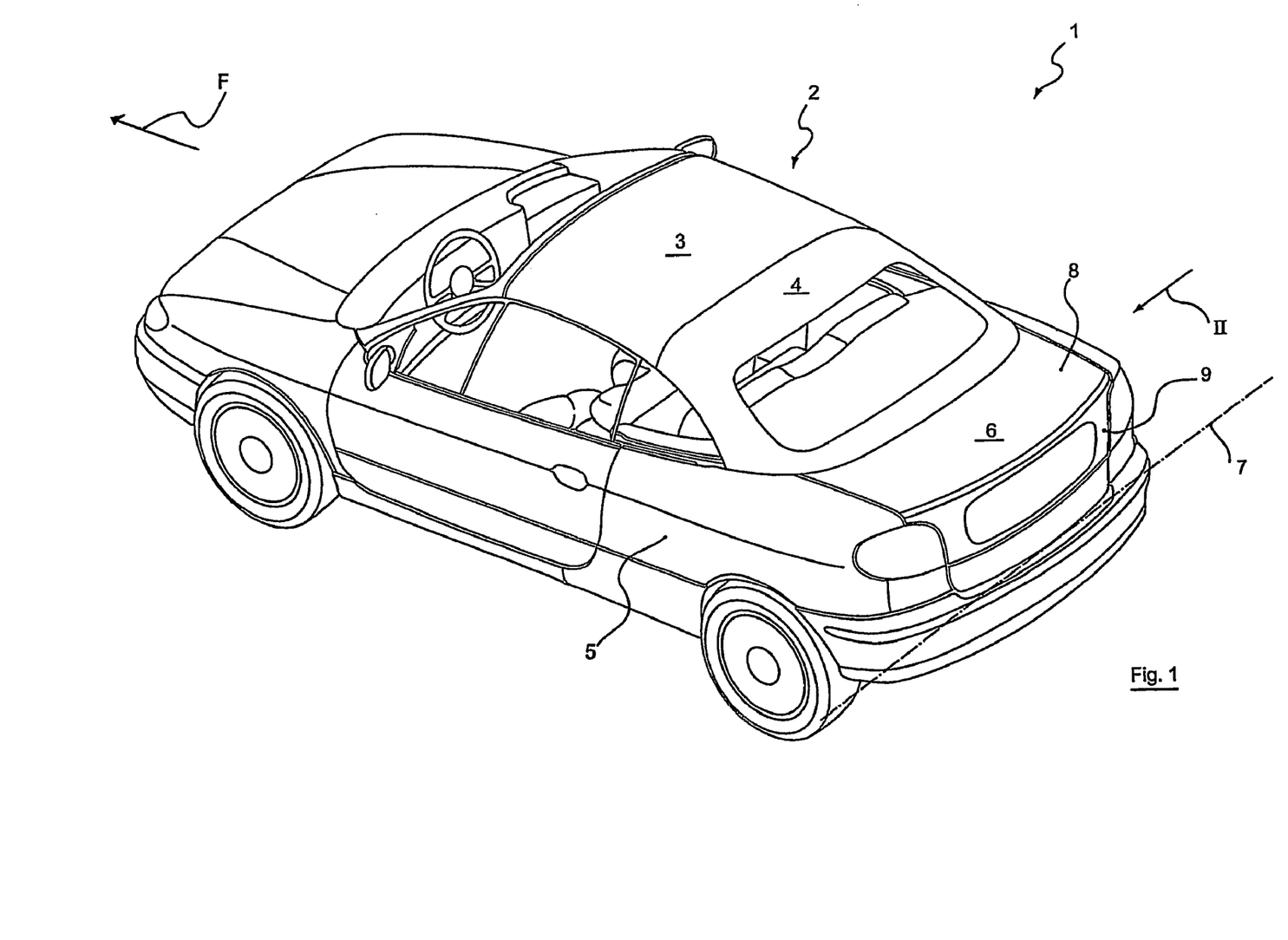
FIG. 1 is an oblique perspective rear view of a convertible automobile according to the invention, its roof and cover panel closed.
Figure 2:
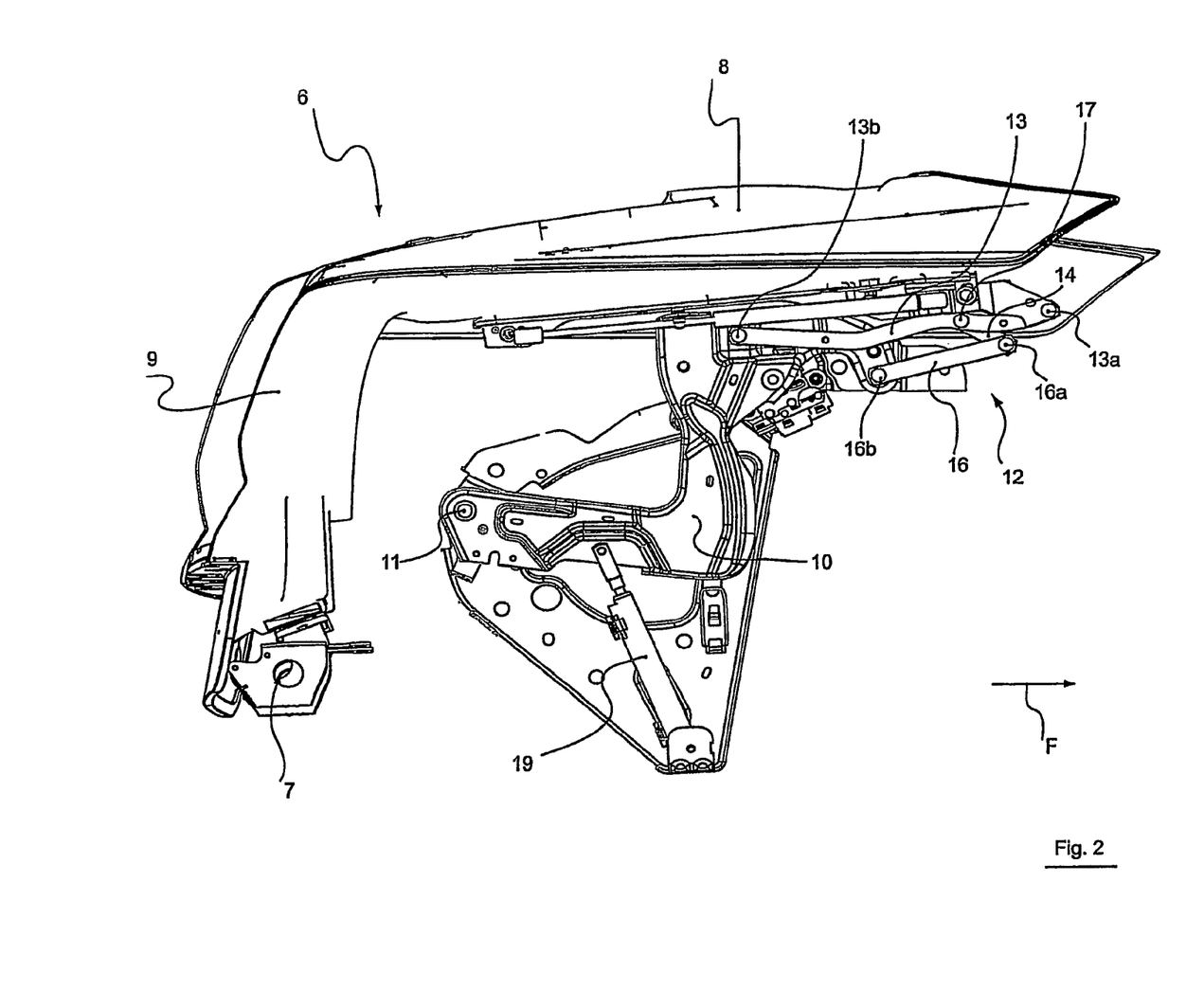
FIG. 2 is a schematic lateral view of the closed cover panel, approximately from the direction of the arrow 11 in FIG. 1.

The convertible automobile 1, schematically illustrated in FIG. 1, encompasses a retractable roof 2 that may consist partly or entirely of rigid components 3, 4. For conversion into its opened state, the roof 2 can be stored in the vehicle body 5 underneath a cover panel 6. Accordingly, the cover panel is pivotably hinge-mounted on the body 5 in the area of a first horizontal swivel axis 7.

The cover panel 6 encompasses an essentially horizontal forward section 8 which, when closed, covers the retracted roof 2, and, connecting to it in the backward direction opposite direction F, an essentially vertical rearward end section 9. The swivel axis 7 is located in the lower area of the vertical end section 9.

In addition, the cover panel 6 is supported by two lateral auxiliary levers 10 that are hinge-mounted on the body 5 on the longitudinal sides of the vehicle and can pivot around horizontal axes 11. In the forward direction F, the axes 11 are positioned ahead of the horizontal swivel axis 7 of the cover panel 6. Viewed from the side, these auxiliary levers 10 are of a goose-necked shape. At their free ends facing away from their respective pivot axis 11, they each support a multiarticulated linkage, summarily bearing the reference number 12, serving as the hinged connection between the cover panel 6 and the auxiliary levers 10. Using these auxiliary levers 10 ensures that the rearward swivel axis 7 does not have to be in the form of a tubular or similar element extending across the entire width of the vehicle but merely needs to extend by a few inches, up to about 6 inches, around a vertical longitudinal center plane of the vehicle on either side of the latter, thus reducing weight as well as space requirements.

Figure 5:
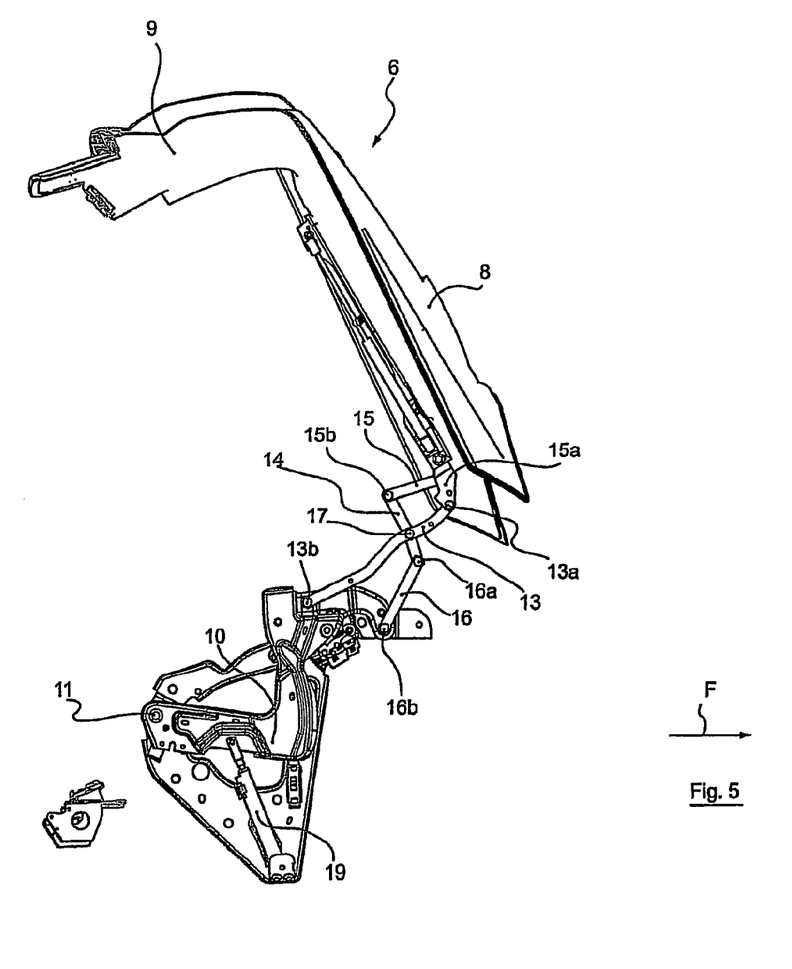
FIG. 5 depicts the cover panel per FIG. 2 as it opens up in the opposite direction to permit access to the baggage compartment/trunk.
Figure 6:
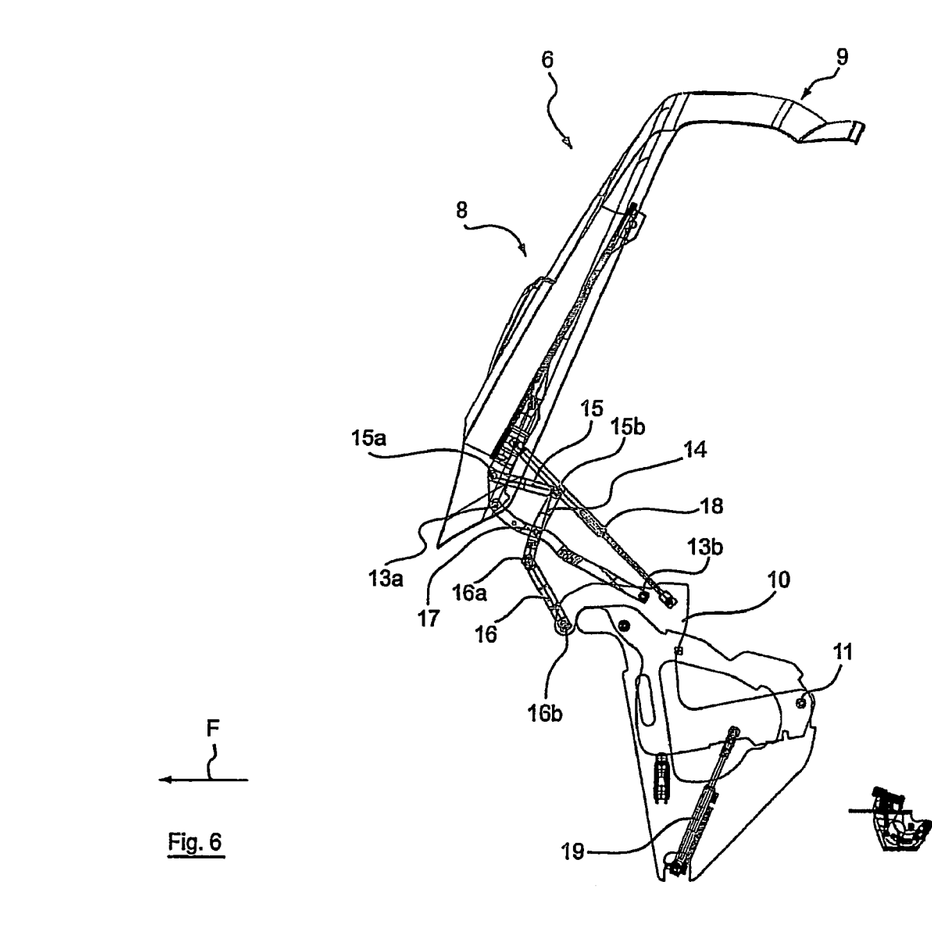
FIG. 6 is a view similar to that in FIG. 5 except from an opposite angle and additionally showing the drive unit.

The multiarticulated linkage 12 in this case, while not imperative, is a seven-joint linkage composed in each case of several links 13, 14, 15, 16, with a through-link 13 pivotably connected at one end joint 13a to the cover panel 6 and at the other joint end 13b to the auxiliary lever 10. When the cover panel 6 is closed, the through-link 13 is in an essentially horizontal position. It is intersected by an intermediate link 14 that connects in articulated fashion to the cover panel 6 by way of the upper link 15 and its joints 15a, 15b, and to the auxiliary lever 10 via the lower link 16 and its joints 16a, 16b while also connecting to the through-link 13 via a joint 17. The joints 13a, 13b, 15a, 15b, 16a, 16b and 17 thus constitute the seven-joint linkage by means of which the baggage-compartment lid can be opened first by a near-parallel lift of the cover panel 6 and only then followed by a tilting-up motion. In that position (FIG. 5, FIG. 6) there will thus be more headroom under the open cover panel 6 as compared to a mere pivot mechanism or a four-joint linkage. Moreover, the seven-joint linkage 12 offers a very high level of stability. In its closed state the cover panel 6 can protrude a good distance in the forward direction F, completely obturating a water deflector.

Figure 3:
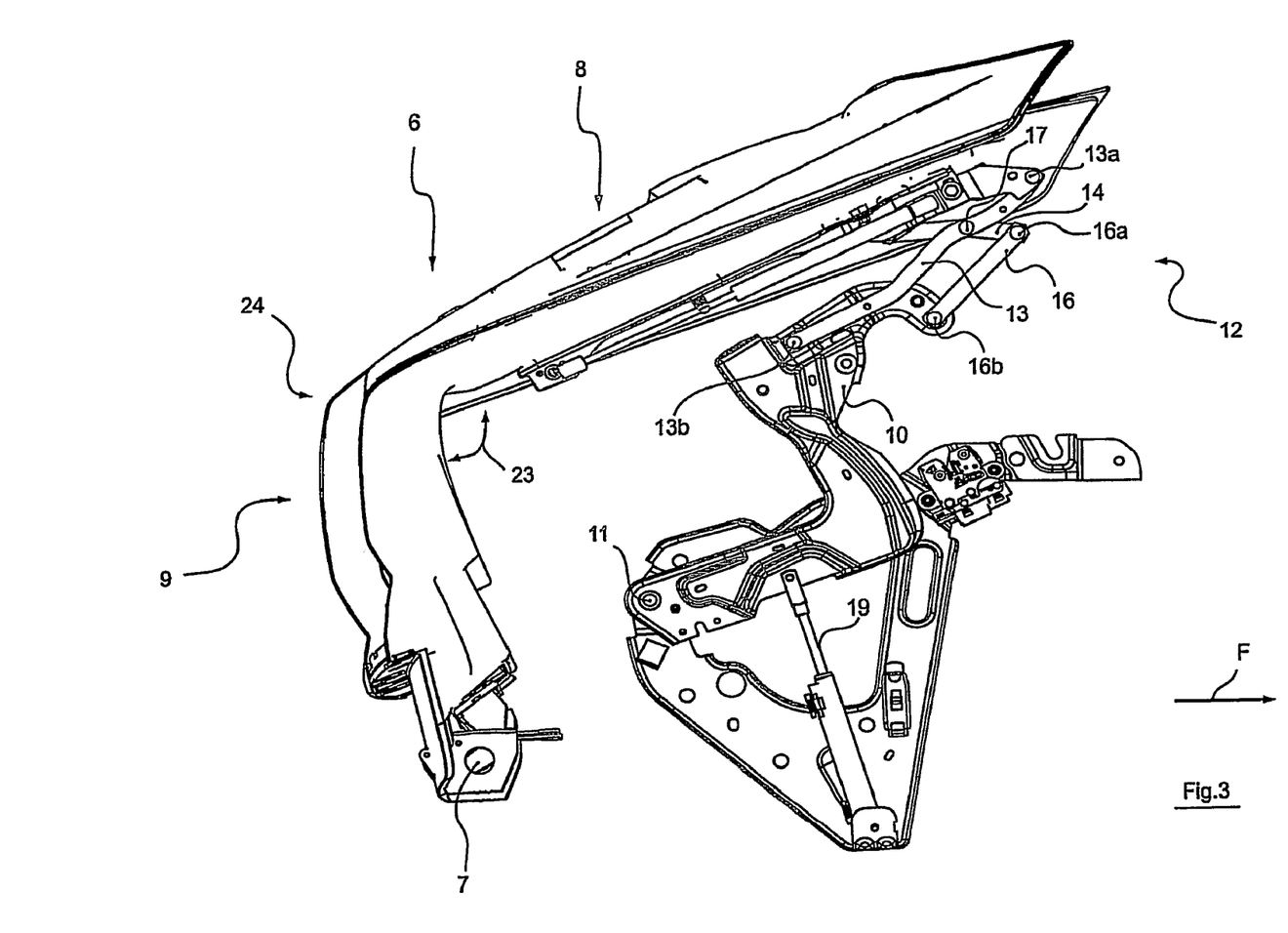
FIG. 3 shows the cover panel per FIG. 2 as it starts to open to clear the port for the roof.
Figure 4:
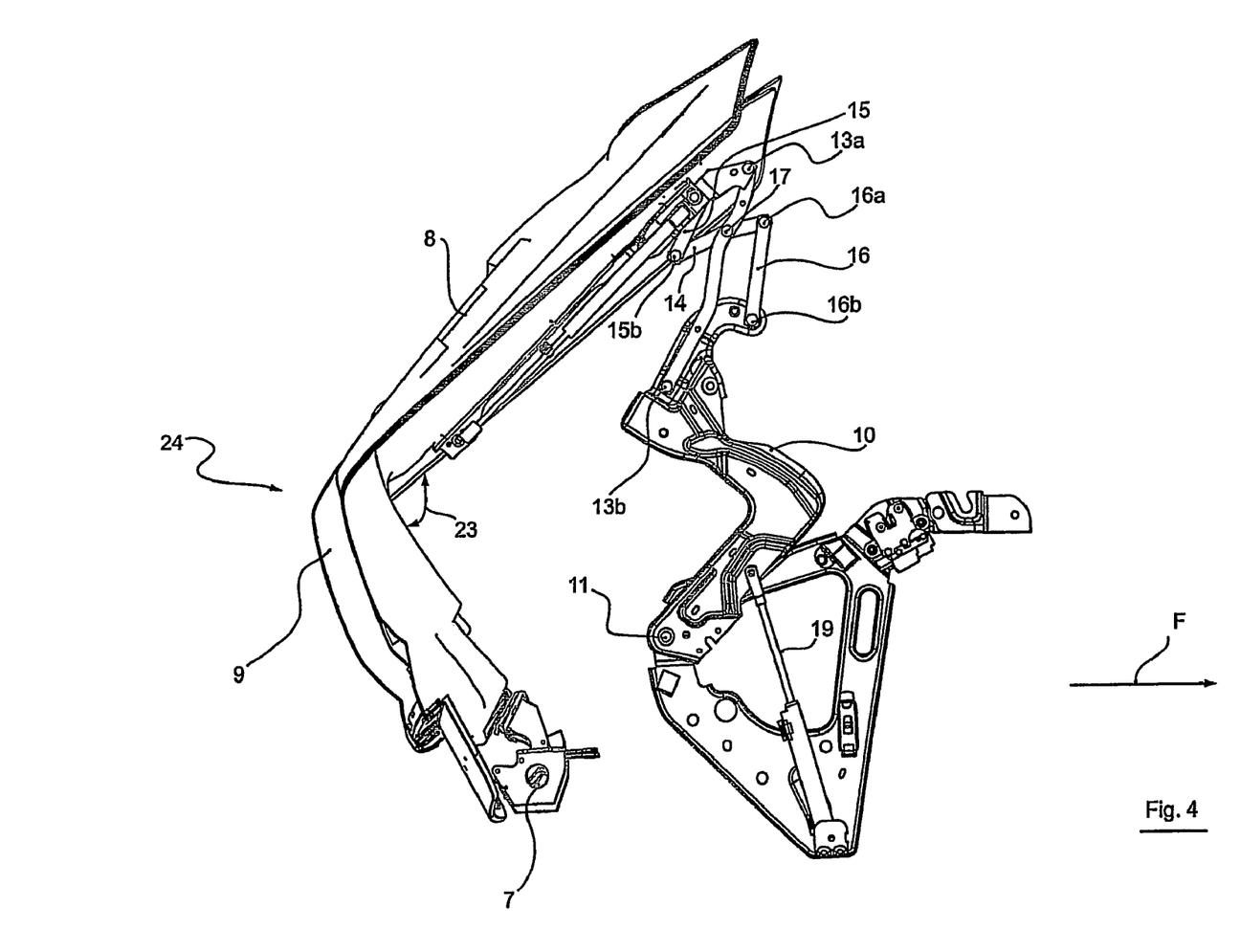
FIG. 4 shows the cover panel per FIG. 3 in a progressive opening state.

An additional drive unit or drive-assist unit 18 such as a gas-pressure or hydraulic cylinder (depicted in FIG. 6) may be provided between the cover panel 6 and the auxiliary levers 10 to raise the multiarticulated linkage 12 for opening the baggage-compartment lid when the cover panel 6 is tilted up. Conversely, when the port for the roof is opened (FIG. 3, FIG. 4) the drive unit 18 can be disengaged.

Another drive unit 19 positioned between the body 5 and the auxiliary levers 10 can serve to open the cover panel 6, clearing the port for the roof 2. Extending the cover panel 6 will cause the auxiliary lever 10 to swivel around the axis 11, tilting rearward and upward. At the same time, its attachment to the multiarticulated linkage 12 will cause the cover panel 6 to pivot around the rearward axis 7 and to tilt upward. Since the axes 7 and 11 are spaced apart, the free ends of the cover panel 6 and, respectively, of the auxiliary levers 10, if of a rigid design, will travel along different circular paths 20, 21 (FIG. 8).

Figure 7:
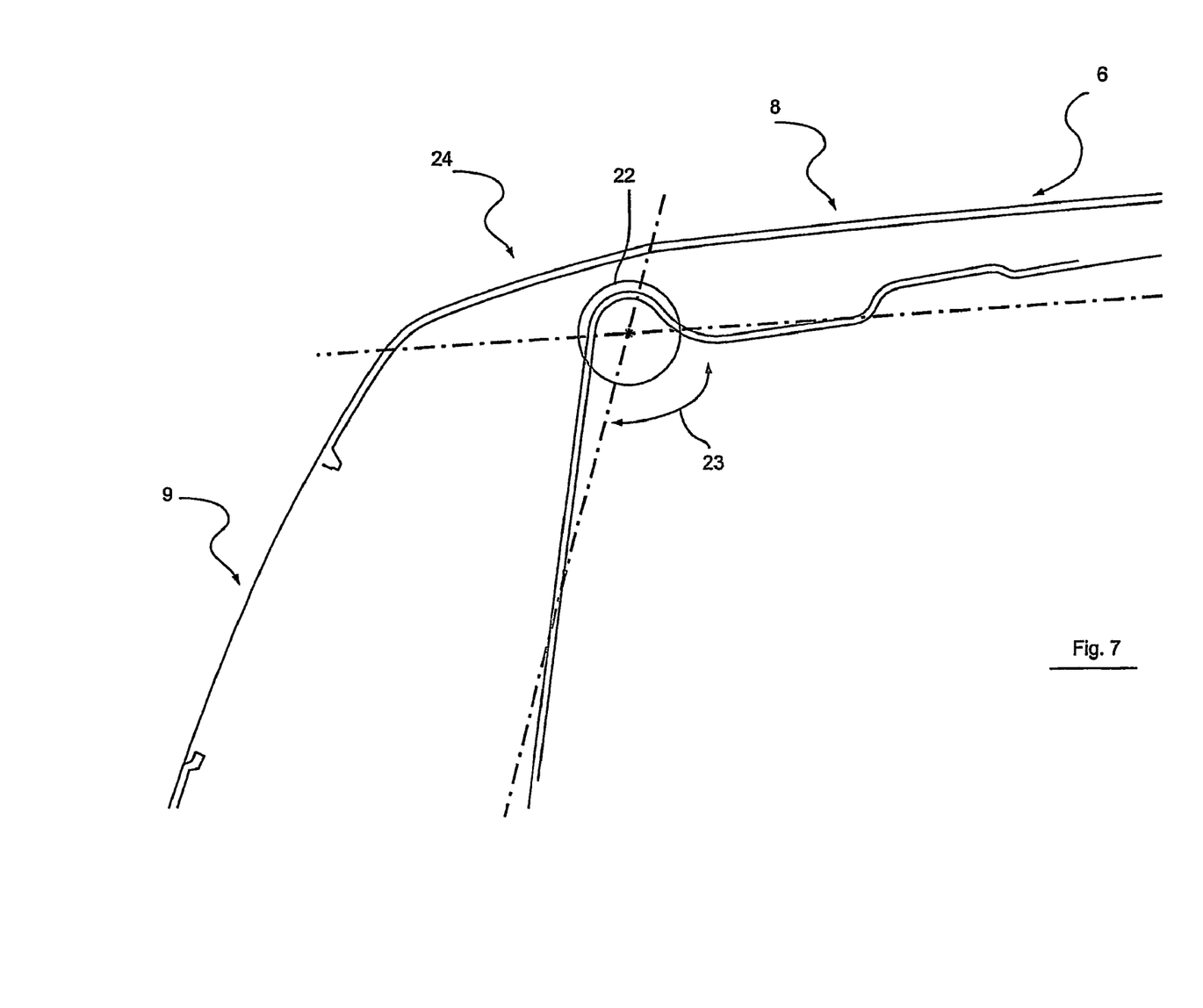
FIG. 7 is a cross-sectional view of the cover panel per FIG. 2, showing a reduced-diameter, predefined flexion point in the transitional area between an essentially horizontal forward and an essentially vertical rearward end section.

This kinematic obstacle that would cause the components 6 and 10 to jam during their movement, can be overcome with a minimum effort by means of a compensating tolerance, whereby the cover panel 6 is made elastically deformable, in and/or against the direction of the arrow 23, at a specific reduced-diameter flexion point 22 in the transitional area between the essentially horizontal section 8 and the essentially vertical section 9 (FIG. 7). The extent of deformability may range over several degrees, typically about 3° to 5°. This creates in the elastic cover panel 6 an additional articulation 24 which, in combination with the pivot action of the cover panel 6 on the rearward swivel axis 7 and with the joints 13a, 13b of the through-link 13 of the multiarticulated linkage 12 and the pivot axis 11 of the auxiliary lever 10, constitutes a five-joint linkage chain. To ensure its elastic deformability, the cover panel 6 is made of a plastic material such as SMC.

In addition or as an alternative to this compensating tolerance in the cover panel 6, such compensating tolerance could also be obtained in the multiarticulated linkage 12 for instance by providing guide slots in which the fulcrum pins of the joints 15a, 13a, 13b, 16b can slide, which would make the multiarticulated linkage 12 as a whole positionally adaptable.

Figure 8:
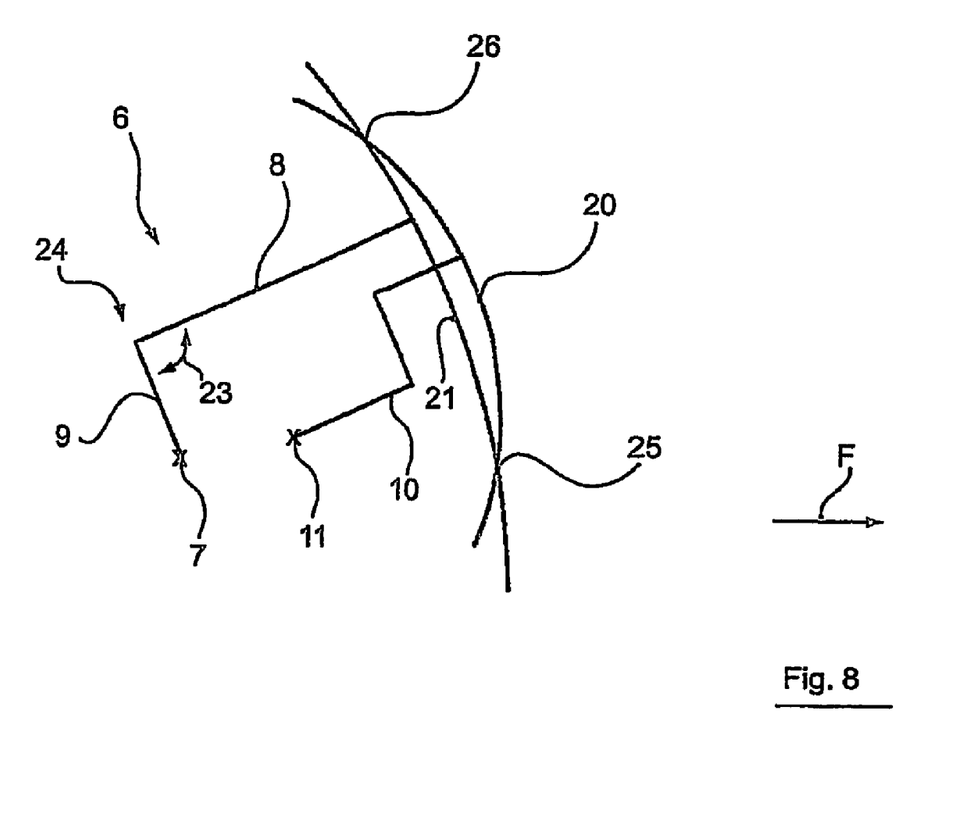
FIG. 8 is a schematic lateral view of the swivel movement of the auxiliary levers and the cover panel, showing the swivel paths of the open ends.

FIG. 8 is a schematic illustration of the circular path 21 of the free end of the cover panel 6 that rotates around the swivel axis 7, and of the path 20 of the free end of the auxiliary lever 10 that rotates around the pivot axis 11. Only when the cover panel 6 is completely closed or opened will these two paths intersect (intersecting points 25 and 26 of the circular paths 20, 21). Advantageously, these two positions do not require any compensating tolerance, allowing the cover panel 6 to be held in a state free of stress or deformation. It is appreciated that the compensating tolerance provided in the cover panel 6 and/or in the linkages 12 results in a deviation of a curvilinear track of part of the cover panel 6 and/or of the linkage 12 from a circular path 20, 21.

In the intermediate phase between opening and closing, the compensating tolerance—of the cover panel 6 in this case—serves to prevent the paths 20 and 21, shown in FIG. 8 for rigid sections, from diverging with an attendant jamming of their movement. By a displacement in or against the direction of the arrow 23, the free end of the cover panel 6 can vary the effective length of the component 8, adapting its travel path 21 to path 20. It is appreciated that in this manner the cover panel 6 can elastically deform, e.g. from 3° to 5°, during normal operation of the panel 6, for example during the normal opening, closing and/or tilting of the cover panel 6.

The invention claimed is:

1. A motor vehicle, comprising:
   a vehicular body having a front section and a rear section and at least two longitudinal sides;
   a retractable roof;
   a cover panel in the rear section of the vehicular body having a first and second end, the cover panel capable of opening at the first end thereof to allow the roof to be stored in the vehicular body;
   at least two auxiliary levers, each having a first and second end and mounted on the longitudinal sides of the vehicular body to support the cover panel;
   at least two linkages having a first and second end and providing a connection between the cover panel and the auxiliary levers, the first end of the linkages having a linkage connection to the first end of the cover panel and the second end of the linkages being connected to the first end of the auxiliary levers; and
   a swivel axis provided at the second end of the cover panel allowing the cover panel to pivot about the axis and rotate to an opened and closed position,
   wherein a compensating tolerance is provided in the cover panel during a tilting motion of the cover panel when the cover panel opens at the first end thereof to allow the roof to be stored in the vehicular body, said compensation tolerance resulting in a deviation of a curvilinear track of the cover panel from its normal circular path during the tilting of the cover panel.

2. The motor vehicle as claimed in claim 1, wherein the cover panel is elastically deformable.

3. The motor vehicle as claimed in claim 1, wherein the cover panel comprises a first section and a second section which are connectable and forms and an angle, the angle between the first and the second sections being elastically variable.

4. The motor vehicle as claimed in claim 1, wherein when the cover panel opens at the fist end to a completely opened position, the cover panel is held in a state free of elastic deformation.

5. The motor vehicle as claimed in claim 1, wherein when the cover panel is in a completely closed position, the cover panel is held in a state free of elastic deformation.

6. The motor vehicle as claimed in claim 1, wherein the cover panel includes a plastic material.

7. The motor vehicle as claimed in claim 1, further comprising:
   a drive unit provided between the cover panel and the at least two auxiliary levers to raise the at least two linkages when the cover panel is opened at the second end of the cover panel.

8. The motor vehicle as claimed in claim 3, wherein the cover panel is elastically deformable at a specific reduced-diameter flexion point in a transitional area between the first section and the second section.

9. The motor vehicle as claimed in claim 8, wherein an extent of deformability is from greater than 0 degrees to 5 degrees.

10. The motor vehicle as claimed in claim 8, wherein an extent of deformability is from greater than 0 degrees to 3 degrees.

* * * * *

UNITED STATES PATENT AND TRADEMARK OFFICE
CERTIFICATE OF CORRECTION

| | |
|---|---|
| PATENT NO. | : 7,735,899 B2 |
| APPLICATION NO. | : 10/547373 |
| DATED | : June 15, 2010 |
| INVENTOR(S) | : Andreas Baumeier |

It is certified that error appears in the above-identified patent and that said Letters Patent is hereby corrected as shown below:

Column 4, line 37 claim 3: After "forms" delete "and".

Column 4, line 41 claim 4: Replace "fist" with --first--.

Signed and Sealed this

Nineteenth Day of October, 2010

David J. Kappos
*Director of the United States Patent and Trademark Office*